S. BROADBENT.
Improvement in Shaft-Couplings.

No. 114,402.    Patented May 2, 1871.

UNITED STATES PATENT OFFICE.

SIDNEY BROADBENT, OF SCRANTON, PENNSYLVANIA.

Letters Patent No. 114,402, dated May 2, 1871.

IMPROVEMENT IN SHAFT-COUPLINGS.

The Schedule referred to in these Letters Patent and making part of the same.

*To all whom it may concern:*

Be it known that I, SIDNEY BROADBENT, of Scranton, in the county of Luzerne and State of Pennsylvania, have invented a new and useful Improvement in Couplings for Shafts, of which the following is a full, clear, and exact description, reference being had to the accompanying drawing forming part of this specification, and in which—

Figure 1:
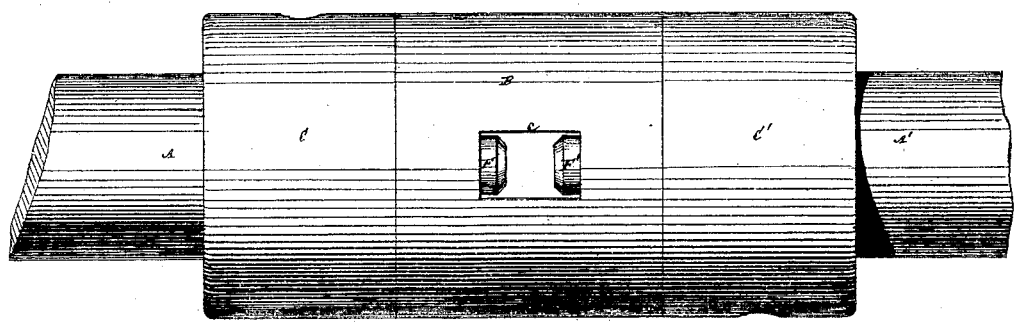
Figure 2:
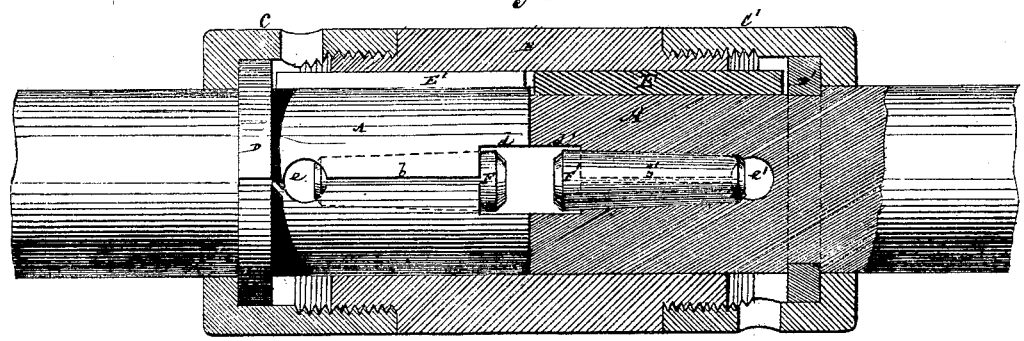

Figure 1 represents an outside longitudinal view of my improved coupling as applied to two lengths of shafting;

Figure 2, an irregularly sectional longitudinal view thereof; and

Figure 3:
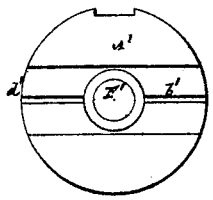

Figure 3, an end view of one of the shafts, with a wedge for expanding the same applied thereto.

Similar letters of reference indicate corresponding parts throughout the several figures.

My invention consists in a coupling in which the adjacent ends of the shafts are split and expanded laterally, to effect a tight hold of the same within a sleeve that is connected with the shafts by devices that serve to draw the shafts longitudinally together, the whole making a firm and solid coupling, free from dangerous or objectionable projections on its exterior.

Referring to the accompanying drawing—

A and A' represent two lengths of shafting, and B the sleeve of the coupling which unites said shafts.

The adjacent ends of these shafts fit snugly within the sleeve from opposite ends thereof, and are drawn together by nuts C C', arranged to screw onto reduced ends of the sleeve, and slipped loosely over the shafts with freedom to turn thereon, but made to draw on the shafts longitudinally when bringing the latter together, by bearing against loose half-collars D D' set into annular grooves in the shafts.

These nuts and sleeve form the only projections, and are preferably made cylindrical, so as to give a flush construction to the coupling, whereby accidents by the coupling catching or striking a workman are avoided.

The sleeve B is connected with the ends of the shafts, which enter it by loose keys, E E', fitted within longitudinal grooves in the shafts and sleeve.

To bind the whole together and make the coupling one solid body, as it were, with the shafts, the ends of the latter, which enter the sleeve, are split longitudinally, as at b b', and tapering keys, fitting longitudinally tapering grooves in the shafts, applied to force the split portions of the shaft out against the sleeve, said keys being made accessible from the exterior of the coupling for the purpose of driving them home.

These keys it is preferred to make of a circular wedge-form, F F' being two such, and to enter the same within conical holes or half-conical grooves made longitudinally in the centers of the shafts from the adjacent ends of the latter.

These wedges are driven home, to expand the shafts against the sleeve, by introducing a temporary wedge or suitable tool through a hole, c, in the sleeve, and recesses d d' in the ends of the shafts, and driving in said tool between the heads of the wedges F F' to force the latter inward.

In this way the nuts C C' bind the shafts in an endwise direction, and the wedges F F', by the split construction of the shafts at their ends, bind said shafts laterally, and the coupling is make a solid one, so that there can be no rattle or shake, and the shafts are strengthened at their junction.

To detach the coupling it is only necessary to unscrew the nuts C C', and to drive the keys or wedges F F' outward from their respective shafts, and which may be done by introducing and driving temporary keys or wedges into holes e e' made in or through the shafts.

What is here claimed, and desired to be secured by Letters Patent, is—

1. The combination, with the longitudinally split shafts and sleeve surrounding the same, of the wedges, accessible from the exterior of the sleeve for expanding the split shafts within it, substantially as specified.

2. The combination of the nuts C C', the sleeve B, and the longitudinally split shafts A A', with the wedges for expanding the shafts laterally, essentially as herein set forth.

3. The arrangement of the opening c in the sleeve, the recesses d d' in the ends of the shafts, and the wedges F F', relatively with the split ends of the shafts A A', substantially as described.

4. The combination of the keys E E' with the sleeve B and split ends of the two shafts, the nuts C C', and the wedges made accessible from the exterior of the sleeve for expanding the split ends of the shaft within it, substantially as specified.

SIDNEY BROADBENT.

Witnesses:
THOS. PETHERICK, Jr.,
JOHN THOMSON.